C. E. CAMPBELL.
HOSE COUPLING.
APPLICATION FILED DEC. 3, 1908.
1,028,187.
Patented June 4, 1912.
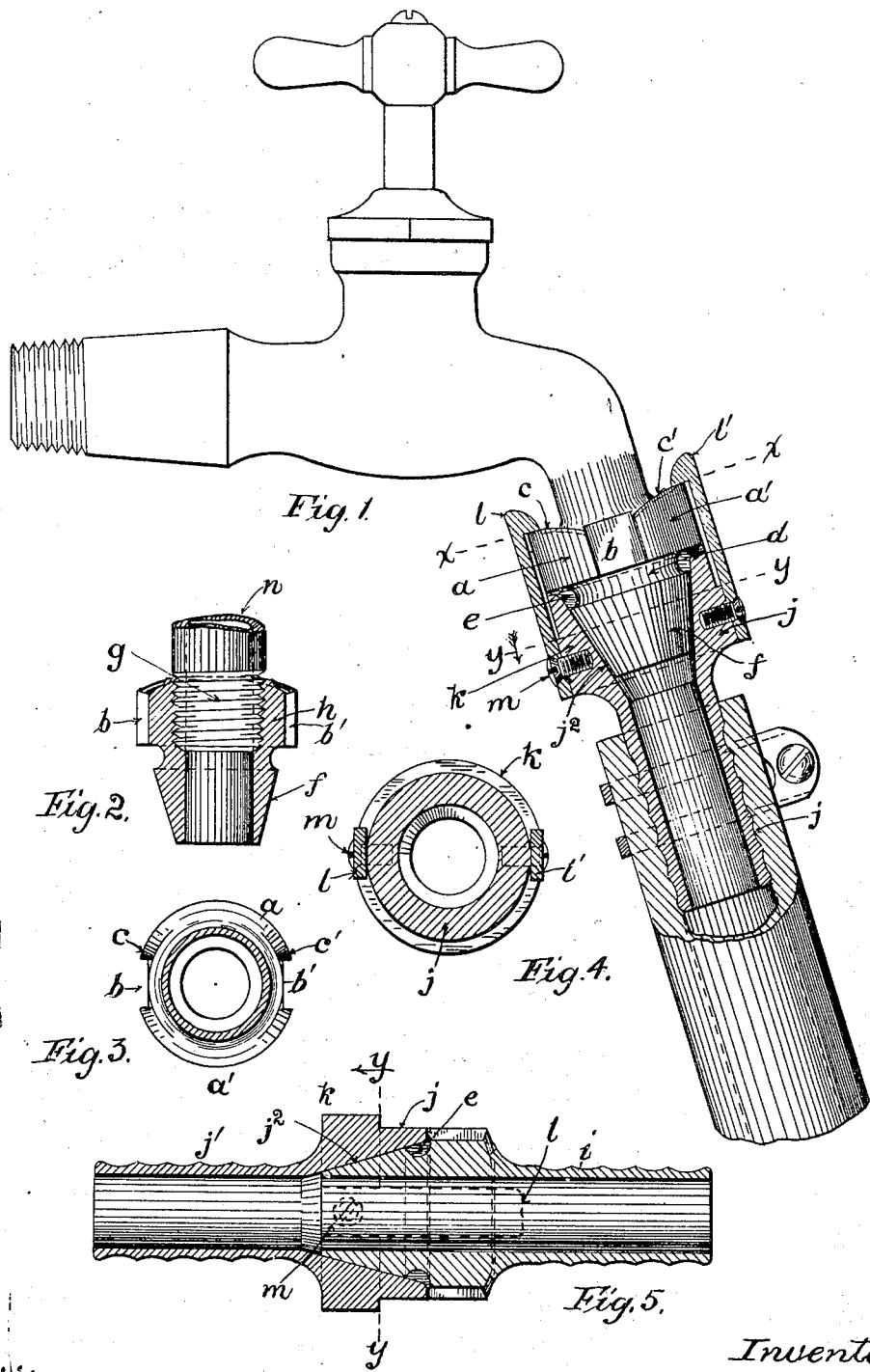
Witnesses:
Cecil Long
S. M. Philbrick
Inventor:
Charles E. Campbell
by T. J. Geisler
Atty.

UNITED STATES PATENT OFFICE.

CHARLES E. CAMPBELL, OF PORTLAND, OREGON, ASSIGNOR TO SIMON S. KEIM, OF NEWBERG, OREGON.

HOSE-COUPLING.

1,028,187.

Specification of Letters Patent.

Patented June 4, 1912.

Application filed December 3, 1908. Serial No. 465,892.

*To all whom it may concern:*

Be it known that I, CHARLES E. CAMPBELL, a citizen of the United States, and a resident of Portland, in the county of Multnomah and State of Oregon, have invented a new and useful Improvement in Hose-Couplings, of which the following is a specification, reference being had to the accompanying drawings as constituting a part thereof.

This invention relates to means for attaching a hose to a faucet, or for coupling two pieces of hose together, and it has for its object to provide inexpensive devices for that purpose which are adapted to permit the coupling and uncoupling to be rapidly done; and to this end embodies the specific features hereinafter fully described and claimed.

In the drawings: Figure 1 shows a faucet provided with a nipple adapted to have my coupling applied thereto, such application being illustrated in this figure, the hose-coupling being shown in section; Fig. 2 shows the discharge-end of an ordinary faucet provided with an exterior thread to have a common hose-coupling affixed thereon, and said faucet is, in this instance, shown as provided with a removable nipple adapted to receive my hose-coupling; Fig. 3 is a horizontal section on line $x$—$x$ of Fig. 1, with the sleeve-member removed; Fig. 4 is a section on line $y$—$y$ of Figs. 1 and 5, looking in the directions pointed by the arrows; and Fig. 5 is a longitudinal section of my invention applied to a hose-coupling.

Referring now to the letters in the several views: In the example of a faucet shown in Fig. 1, the spout thereof is adapted to have my hose-coupling affixed thereon, and to this end is provided with opposite flange-portions $a$, $a'$, separated by recesses $b$, $b'$; see Fig. 3. The upper surfaces of the flange-portions $a$, $a'$ are inclined planes having approaches $c$, $c'$ at opposite ends for the purpose hereinafter specified. Under the flange-portions $a$, $a'$ is provided an annular groove $d$, in which to receive an elastic ring $e$. The lower portion, $f$, of the spout constitutes a nipple. The latter is made tapering or cone-shaped and is preferably ground so as to make a tight joint with its companion sleeve-member. When my coupling is to be applied to a faucet of the common type, provided with a nipple having a common thread $g$, I screw on the complementary-spout, $n$, of the faucet a nipple-part $h$, shown in Fig. 2, which in its exterior form is the same as that shown in Fig. 1, and by its use the common faucet is adapted to have my coupling secured thereon.

In Fig. 5 the nipple-part of my hose-coupling is shown as provided with a neck $i$, so as to have the end of a hose affixed thereon as usual; the construction of the nipple-part of my coupling being otherwise identical with that shown in Figs. 1 and 2. The companion-member of my coupling consists of a sleeve $j$, made with an integral neck $j'$ of the usual construction, and provided with a peripheral flange $k$, recessed at opposite sides to receive spring-hooks $l$, $l'$, which are secured in place by screws $m$; the cut-out portion in the flange $k$ providing a seat for more rigidly holding the hook-members $l$, $l'$ in place. The interior face, $j^2$, of the sleeve-member $j$ is ground to make a close-fitting joint with the nipple-member above described.

The operation of my coupling is as follows: To affix the sleeve coupling-member on the nipple coupling-member, the hooks $l$, $l'$ of the former are pushed through the recesses of the flange-portions $a$, $a'$ of the nipple coupling-member. The sleeve-member $j$ is then given a partial turn in either direction, thereby causing the heads of the hook-members $l$, $l'$ to climb up on the inclined approaches $c$, $c'$ of said flange-portions and lock the latter, thereby tightly drawing the parts together. The elastic ring $e$ assists the forming of a water-tight joint. To uncouple, all required to be done is to give the sleeve-coupling $j$ a reverse turn, so as to again bring the heads of the hook-members $l$, $l'$ in alinement with the recesses $b$, $b'$, and thereupon the sleeve-coupling may be removed. The rapidity with which the coupling and uncoupling acts can be performed is self evident.

I claim:

1. In a hose coupling, a nipple-like male part adapted to be affixed to the spout of a faucet, said nipple provided with a cone-shaped spout and further provided with oppositely located peripheral flanges spaced apart, the upper faces of said flanges formed with inclined planes, a gasket affixed on the spout of the male part directly under its said flanges, and a female part adapted to be inserted in a hose end and having a corresponding cone-shaped aperture, spring hook-members on the exterior of said female part in position to be inserted between and to engage with said inclined planes of the flanges of the male part.

2. In a hose coupling, a nipple-like male part, said nipple provided with a cone-shaped spout and further provided with oppositely located peripheral flanges spaced apart, the upper faces of said flanges formed with inclined planes, said spout provided with a peripheral groove directly under said flanges, a packing ring in said groove, and a female part adapted to be inserted in a hose end and having a corresponding cone-shaped aperture, spring hook-members on the exterior of said female part in position to be inserted between and to engage with said inclined planes of the flanges of the male part.

3. In a hose coupling, a nipple-like male part, said nipple provided with a cone-shaped spout and further provided with oppositely located peripheral flanges spaced apart, the upper faces of said flanges formed with inclined planes, a gasket affixed on the male part directly under its said flanges; and a female part adapted to be inserted in a hose end and having a corresponding cone-shaped aperture, spring hook-members on the exterior of said female part in position to be inserted between and to engage with said inclined planes of the flanges of the male part.

CHARLES E. CAMPBELL.

Witnesses:
T. J. GEISLER,
S. M. PHILBRICK.